(12) United States Patent
Chang et al.

(10) Patent No.: US 8,421,079 B2
(45) Date of Patent: Apr. 16, 2013

(54) PIXEL STRUCTURE

(75) Inventors: Chia-Ming Chang, New Taipei (TW); Wei-Sheng Yu, Taipei (TW); Ming-Hao Chang, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 211 days.

(21) Appl. No.: 13/094,832

(22) Filed: Apr. 27, 2011

(65) Prior Publication Data

US 2012/0161135 A1 Jun. 28, 2012

(30) Foreign Application Priority Data

Dec. 24, 2010 (TW) .............................. 99145915 A

(51) Int. Cl.
*H01L 27/15* (2006.01)

(52) U.S. Cl.
USPC ..................................... 257/59; 257/E27.121

(58) Field of Classification Search .......................... None
See application file for complete search history.

(56) References Cited

U.S. PATENT DOCUMENTS

| | | | | |
|---|---|---|---|---|
| 6,809,338 B2 * | 10/2004 | Murade | ........................... | 257/72 |
| 7,256,061 B2 * | 8/2007 | Yang | ............................... | 438/30 |
| 7,532,263 B2 * | 5/2009 | Lee et al. | ......................... | 349/38 |
| 7,683,977 B2 * | 3/2010 | Nagata et al. | .................... | 349/42 |
| 7,893,440 B2 * | 2/2011 | Kwon et al. | .................... | 257/72 |
| 8,106,402 B2 * | 1/2012 | Yeo et al. | ......................... | 257/72 |
| 8,324,629 B2 * | 12/2012 | Jeong et al. | ..................... | 257/72 |
| 2006/0119753 A1 | 6/2006 | Luo et al. | | |
| 2009/0166633 A1 | 7/2009 | Lee et al. | | |

* cited by examiner

*Primary Examiner* — Benjamin Sandvik
(74) *Attorney, Agent, or Firm* — Jianq Chyun IP Office

(57) ABSTRACT

A pixel structure having an SMII (semiconductor-metal-insulator-ITO) capacitor is provided. Specifically, a partial region of a transparent electrode layer corresponding to a semiconductor layer is removed, so as to eliminate parasitic capacitance between the transparent electrode layer and the semiconductor layer, prevent defects (e.g., waterfall, image sticking, etc.) from occurring on the display frame, and improve the display quality.

8 Claims, 4 Drawing Sheets

PIXEL STRUCTURE

CROSS-REFERENCE TO RELATED APPLICATION

This application claims the priority benefit of Taiwan application serial no. 99145915, filed Dec. 24, 2010. The entirety of the above-mentioned patent application is hereby incorporated by reference herein and made a part of this specification.

BACKGROUND OF THE INVENTION

1. Field of the Invention

The invention relates to a pixel structure. More particularly, the invention relates to a pixel structure in which a storage capacitor (Cst) has a semiconductor-metal-insulator-ITO (SMII) structure.

2. Description of Related Art

A thin film transistor liquid crystal display (TFT-LCD) is often composed of a thin film transistor (TFT) array, a color filter array substrate, and a liquid crystal layer. The TFT array is constituted by a plurality of TFTs arranged in array and pixel electrodes respectively corresponding to the TFTs. In order to ensure the favorable display data memory and display data retention function of the conventional pixel structure, a storage capacitor is configured in a pixel structure in most cases. For instance, a pixel electrode covers a metal capacitor electrode, so as to form an MII storage capacitor.

According to the related art, a source metal layer is often employed to form the metal capacitor electrode having the MII structure. In some manufacturing processes, e.g., a manufacturing process in which four photo masks are required, a semiconductor layer underlies the source metal layer, and the semiconductor layer and the pixel electrode located above the source can together form a SMII capacitor. The source metal layer exposes a portion of the periphery of the semiconductor layer. The pixel electrode located above the source is connected to the pixel electrode which is not located above the source. Nonetheless, when the semiconductor material is irradiated by light, the semiconductor material is conductive. Thereby, parasitic capacitance is generated by the exposed semiconductor layer and the pixel electrode located above the semiconductor layer according to different operational conditions, e.g., different frequencies, different voltages, and so on. As such, the capacitance of the SMII storage capacitor is changed, and defects (e.g., waterfall, image sticking, etc.) occur on the display frame.

SUMMARY OF THE INVENTION

The invention is directed to a pixel structure which can eliminate parasitic capacitance generated between a semiconductor layer and a transparent electrode in a SMII capacitor, prevent defects (e.g., waterfall, image sticking, etc.) from occurring on a display frame, and improve the display quality.

To embody the invention, a pixel structure that includes a substrate, a scan line, a data line, a TFT, a semiconductor layer, a metal capacitor electrode, a passivation layer, a pixel electrode, and a transparent capacitor electrode is provided. The data line and the scan line are configured on the substrate, and an extension direction of the data line intersects an extension direction of the scan line. The TFT is configured on the substrate and electrically connected to the scan line and the data line. The semiconductor layer is configured on the substrate, and the metal capacitor electrode is configured on the semiconductor layer. A projection area of the metal capacitor electrode on the substrate is located within a projection area of the semiconductor layer on the substrate, and an edge of the projection area of the metal capacitor electrode is spaced from an edge of a projection area of the semiconductor layer. The passivation layer is configured on the substrate and covers the scan line, the data line, the TFT, the metal capacitor electrode, and the semiconductor layer. The pixel electrode is configured on the passivation layer and electrically connected to the TFT. A projection area of the pixel electrode on the substrate is located outside the projection area of the semiconductor layer on the substrate. The transparent capacitor electrode is configured on the passivation layer. A projection area of the transparent capacitor electrode on the substrate is located within the projection area of the metal capacitor electrode on the substrate.

According to an embodiment of the invention, a minimum distance between an edge of the projection area of the transparent capacitor electrode on the substrate and the edge of the projection area of the metal capacitor electrode on the substrate is greater than or substantially equal to 0 micrometer and smaller than or substantially equal to 6 micrometers.

According to an embodiment of the invention, a minimum distance between an edge of the projection area of the transparent capacitor electrode on the substrate and the edge of the projection area of the metal capacitor electrode on the substrate is greater than or substantially equal to 1 micrometer and smaller than or substantially equal to 4 micrometers.

According to an embodiment of the invention, a minimum distance between an edge of the projection area of the pixel electrode on the substrate and the edge of the projection area of the semiconductor layer on the substrate is greater than or substantially equal to 1.6 micrometer and smaller than or substantially equal to 6 micrometers.

According to an embodiment of the invention, a minimum distance between an edge of the projection area of the pixel electrode on the substrate and the edge of the projection area of the semiconductor layer on the substrate is greater than or substantially equal to 2 micrometers and smaller than or substantially equal to 4 micrometers.

According to an embodiment of the invention, the pixel structure further includes a gate metal layer that is located on the substrate. A projection area of the gate metal layer on the substrate at least covers an area of the substrate other than the projection area of the pixel electrode on the substrate.

According to an embodiment of the invention, the pixel structure further includes a gate insulation layer that is configured between the passivation layer and the substrate. The gate insulation layer covers the gate metal layer.

According to an embodiment of the invention, the pixel electrode has a plurality of fine slits.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Figure 1:
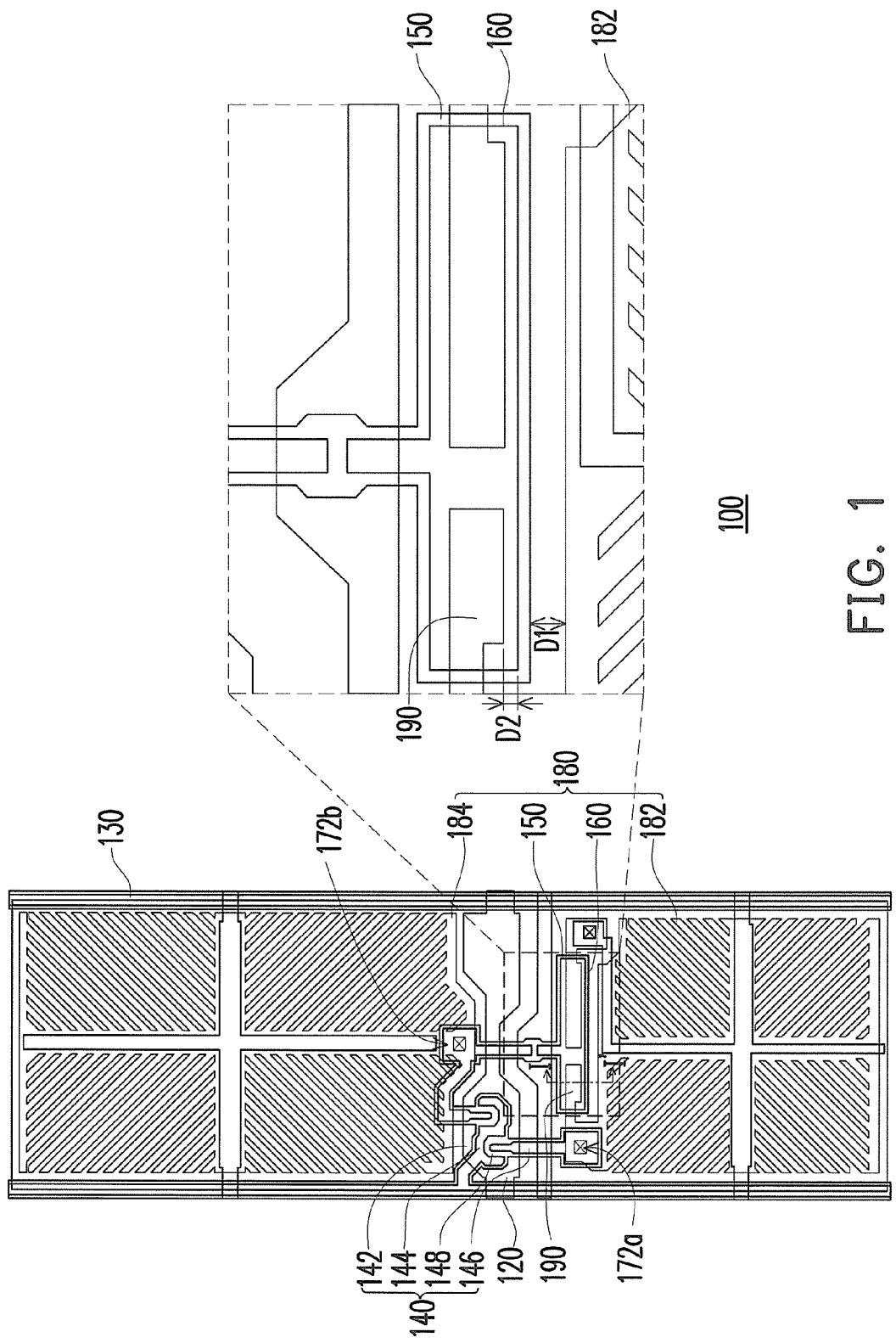
FIG. 1 illustrates a pixel structure according to an embodiment of the invention.
Figure 2:
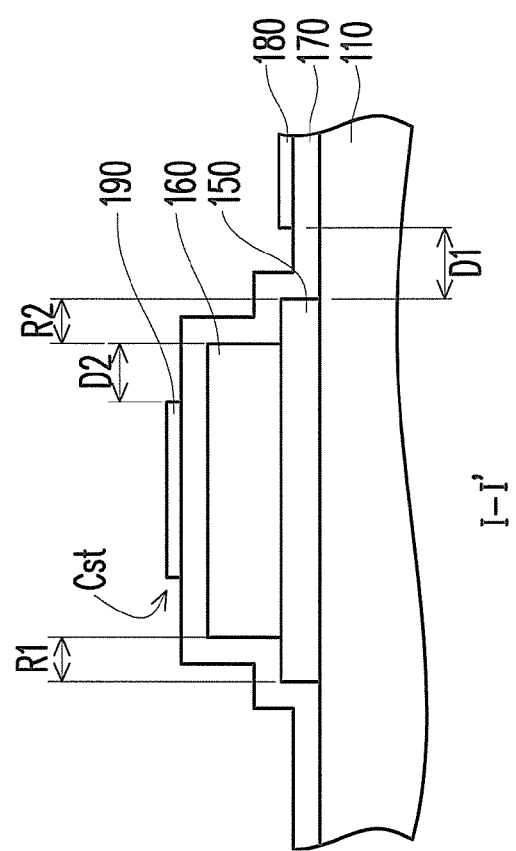
FIG. 2 is a partial cross-sectional view illustrating the pixel structure depicted in FIG. 1.

FIG. 1 illustrates a pixel structure according to an embodiment of the invention. FIG. 2 is a partial cross-sectional view illustrating the pixel structure depicted in FIG. 1. With reference to FIG. 1 and FIG. 2, the pixel structure 100 includes a substrate 110, a scan line 120, a data line 130, a TFT 140, a semiconductor layer 150, a metal capacitor electrode 160, a passivation layer 170, a pixel electrode 180, and a transparent capacitor electrode 190. In particular, the SMII storage capacitor Cst of this embodiment is constituted by the semiconductor layer 150, the metal capacitor electrode 160, the passivation layer 170, and the transparent capacitor electrode 190.

Besides, the scan line 120 and the data line 130 are configured on the substrate 110, and an extension direction of the data line 130 intersects an extension direction of the scan line 120, so as to define the area occupied by the pixel structure 100. The TFT 140 is configured on the substrate 110 and electrically connected to the scan line 120 and the data line 130. Here, the TFT 140 includes a gate, a channel layer, a source, and a drain, and the TFT 140 can be categorized into a bottom-gate TFT or a top-gate TFT, either of which can be applied in the following embodiments. To be more specific, the TFT 140 is directly formed on the scan line 120 in this embodiment. Namely, the scan line 120 serves as the gate 142 of the TFT 140, and the source 144 of the TFT 140 is connected to the data line 130. The TFT 140 acts as a switch element of the pixel structure 100. A certain pixel structure 100 can be selected according to the scan line 120 and the data line 130 that are coupled to the TFT 140, and an operating voltage can be properly applied to the selected pixel structure 100, so as to display the data corresponding to the pixel structure 100.

The semiconductor layer 150 is configured on the substrate 110. Here, the semiconductor layer 150 and the channel layer 148 in the TFT 140 are formed by the same semiconductor material layer in the same manufacturing process, which should however not be construed as a limitation to the invention. Preferably, the semiconductor layer 150 is separated from the channel layer 148 in the TFT 140. Namely, the semiconductor layer 150 and the channel layer 148 are not connected to each other. In other embodiments of the invention, the semiconductor layer 150 and the channel layer 148 in the TFT 140 can be selectively connected to each other. At least one of the semiconductor layer 150 and the channel layer 148 can have a single-layer structure or a multi-layer structure and can be made of amorphous silicon, polysilicon, monosilicon, micro-silicon, a metal oxide semiconductor material, an organic semiconductor material, the above-mentioned material containing dopant, any other appropriate semiconductor material, or a combination thereof. The metal capacitor electrode 160 is configured on the semiconductor layer 150. A projection area of the metal capacitor electrode 160 on the substrate 110 is located within a projection area of the semiconductor layer 150 on the substrate 110, and an edge of the projection area of the metal capacitor electrode 160 is spaced from an edge of a projection area of the semiconductor layer 150. That is to say, a portion of the semiconductor layer 150 is exposed outside the metal capacitor electrode 160. The metal capacitor electrode 160 of this embodiment and the source 144 and the drain 146 in the TFT 140 are made of the same metal material layer in the same manufacturing process, for instance. Preferably, the metal capacitor electrode 160 is separated from the source 144 and the drain 146 in the TFT 140. Namely, the metal capacitor electrode 160 is not connected to the source 144 and the drain 146.

The passivation layer 170 is configured on the substrate 110 and covers the scan line 120, the data line 130, the TFT 140, the semiconductor layer 150, and the metal capacitor electrode 160. The pixel electrode 180 includes a first pixel electrode 182 and a second pixel electrode 184 that are respectively located at two opposite sides of the scan line 120 and configured on the passivation layer 170. The first pixel electrode 182 and the second pixel electrode 184 are electrically connected to the drain 146 of the TFT 140 through openings 172a and 172b of the passivation layer 170, respectively. In addition, each of the first pixel electrode 182 and the second pixel electrode 184 has a plurality of fine slits for aligning liquid crystal molecules.

The projection area of the first pixel electrode 182 and the second pixel electrode 184 on the substrate 110 is located outside the projection area of the semiconductor layer 150 on the substrate 110. From the section I-I' shown in FIG. 2, it can be observed that the minimum distance D1 between an edge of the projection area of the first pixel electrode 182 (or the second pixel electrode 184) on the substrate 110 and the edge of the projection area of the semiconductor layer 150 on the substrate 110 is greater than or substantially equal to 0 micrometer. For instance, the minimum distance D1 can be greater than or substantially equal to 1.6 micrometer and can be smaller than or substantially equal to 6 micrometers. Alternatively, the minimum distance D1 can be greater than or substantially equal to 2 micrometers and can be smaller than or substantially equal to 4 micrometers. However, the minimum distance D1 affects the aperture ratio of the pixel. For instance, given the pixel electrode 180 is far away from the semiconductor layer 150, the aperture ratio of the pixel is relatively small. Hence, people having ordinary skill in the pertinent art can determine the minimum distance D1 based on actual pixel structure and design requirements.

The transparent capacitor electrode 190 is configured on the passivation layer 170, such that the transparent capacitor electrode 190, the semiconductor layer 150, the metal capacitor electrode 160, and the passivation layer 170 together constitute the SMII storage capacitor Cst. The projection area of the transparent capacitor electrode 190 on the substrate 110 is located within the projection area of the metal capacitor electrode 160 on the substrate 110. In this embodiment, the transparent capacitor electrode 190 and the pixel electrode 180 are formed by the same transparent conductive material layer in the same manufacturing process, for instance. Besides, the transparent conductive material layer located above a portion of the semiconductor layer 150 (e.g., regions R1 and R2) exposed outside the metal capacitor electrode 160 is removed by performing a patterning process in this embodiment, and thereby no parasitic capacitance is generated by the exposed portion of the semiconductor layer 150 and the transparent conductive material layer. In other words, the transparent capacitor electrode 190 and the pixel electrode 180 are separated from each other.

From the section I-I' depicted in FIG. 2, it can be observed that the minimum distance D2 between an edge of the projection area of the transparent capacitor electrode 190 on the substrate 110 and an edge of the projection area of the metal capacitor electrode 160 on the substrate 110 is greater than or substantially equal to 0. For instance, the minimum distance D2 can be greater than or substantially equal to 0 micrometer and can be smaller than or substantially equal to 6 micrometers. Alternatively, the minimum distance D2 can be greater than or substantially equal to 1 micrometer and can be smaller than or substantially equal to 4 micrometers. However, the minimum distance D2 is determined on the actual pixel structure and the design requirements. For instance, given the transparent capacitor electrode 190 is small, the storage capacitance Cst is relatively small; given the transparent capacitor electrode 190 is large, the storage capacitance Cst is relatively large, and the aperture ratio of the pixel is relatively small.

Figure 3:
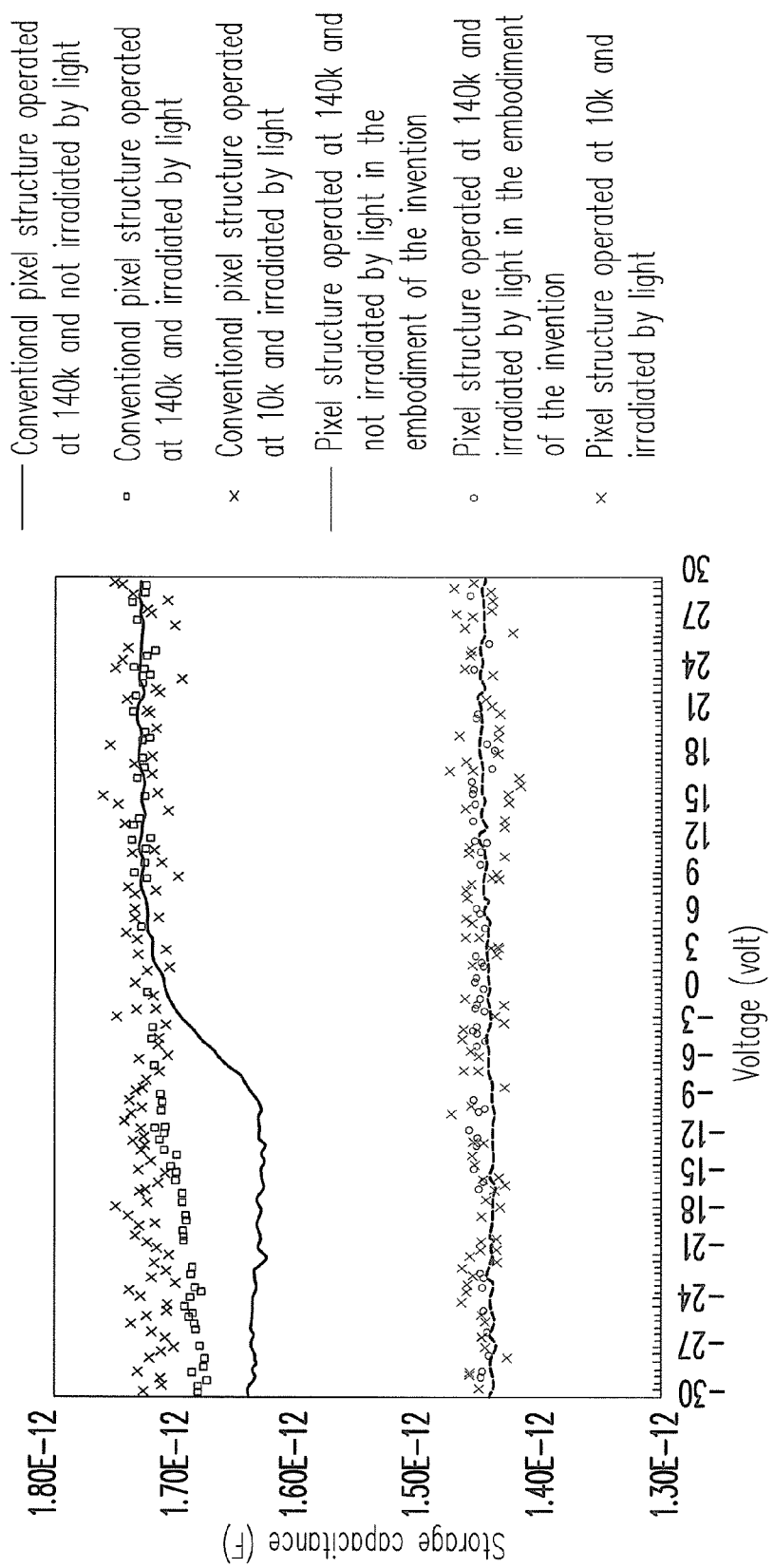
FIG. 3 illustrates electrical curves of a conventional pixel structure and a pixel structure of the invention which are in different operating states.

FIG. 3 illustrates storage capacitance-voltage correlation curves of a conventional pixel structure and a pixel structure of the invention which are in different operating states. Specifically, the curves show the correlation between the storage capacitance (farad, F) and the voltage when the conventional pixel structure is operated at a high frequency (140 KHz), operated at a high frequency (140 KHz) and irradiated by light, or operated at a low frequency (10 KHz) and irradiated by light and when the pixel structure 100 of this embodiment is operated at a high frequency (140 KHz), operated at a high frequency (140 KHz) and irradiated by light, or operated at a low frequency (10 KHz) and irradiated by light. Here, the distance D1 of the pixel structure 100 is approximately 2 micrometers, and the distance D2 is approximately 1.5 micrometer. As shown in FIG. 3, the electrical performance of the pixel structure 100 of this embodiment is consistent regardless of the operating states of the pixel structure 100. Namely, the impact of parasitic capacitance in the SMII storage capacitor Cst is significantly reduced in the pixel structure 100 of this embodiment, such that the electrical performance of the pixel structure 100 is rather stable, and that favorable display quality can be guaranteed.

Figure 4:
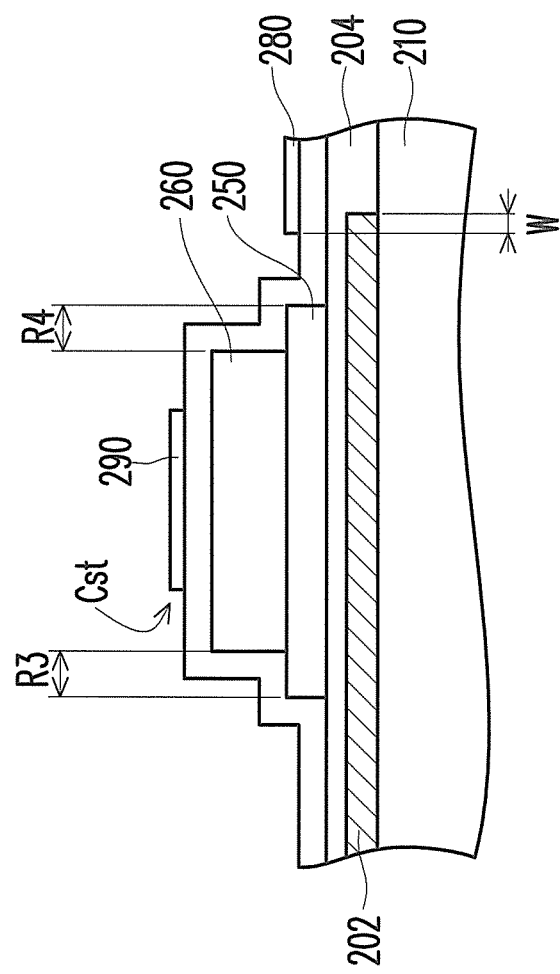
FIG. 4 is a partial cross-sectional view illustrating a pixel structure according to another embodiment of the invention.

FIG. 4 is a partial cross-sectional view illustrating a pixel structure according to another embodiment of the invention. As shown in FIG. 4, the pixel structure 200 of this embodiment is similar to the pixel structure 100 described in the previous embodiment, while the pixel structure 200 of this embodiment further has a shielding layer 202 and a gate insulation layer 204. The shielding layer 202 is located below the semiconductor layer 250, and the gate insulation layer 204 covers the shielding layer 202. The shielding layer 202 and the gate metal layer are made of the same material in the same manufacturing process, for instance. In detail, the shielding layer 202 is formed by extending the gate metal which is served to form the gate electrode of the thin film transistor of the pixel electrode structure 200 below the semiconductor layer 250, the gate insulator 204 is located between the passivation layer 270 and the substrate 210 covers the gate metal layer which is served as the shielding layer 202. In the pixel structure 200 of this embodiment, the transparent electrode layer corresponding to the semiconductor layer 250 is removed. Namely, the transparent conductive material layer located above a portion of the semiconductor layer 250 (e.g., regions R3 and R4) exposed outside the metal capacitor electrode 260 is removed, so as to form the transparent capacitor electrode 290 and the pixel electrode 280. Thereby, the liquid crystal molecules corresponding to the hollow area may be irregularly arranged, which leads to light leakage during image display. The shielding layer 202 can thus be applied to shield the light leakage area. Namely, the projection area of the shielding layer 202 on the substrate 210 at least covers the area of the substrate 210 other than the projection area of the pixel electrode 280 on the substrate 210. For instance, the width W of the overlapping portion of the projection area of the shielding layer 202 on the substrate 210 and the projection area of the pixel electrode 280 on the substrate 210 can be greater than or substantially equal to 2 micrometers.

In light of the foregoing, the SMII capacitor in the pixel structure is modified according to the embodiments of the invention. Specifically, a partial region of the transparent electrode layer corresponding to the semiconductor layer is removed, so as to eliminate the parasitic capacitance between the transparent electrode layer and the semiconductor layer, prevent defects (e.g., waterfall, image sticking, etc.) from occurring on the display frame, and improve the display quality. In addition, the shielding layer can be formed in the hollow area of the transparent electrode layer to cover the light leakage.

Although the invention has been described with reference to the above exemplary embodiments, they are not intended to limit the invention. The pixel structure mentioned in the embodiments is merely exemplary, and the pixel structure having the SMII storage capacitor or the like is still construed as a part of the technical proposal of the application. It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A pixel structure comprising:
   a substrate;
   a scan line configured on the substrate;
   a data line configured on the substrate, an extension direction of the data line intersecting an extension direction of the scan line;
   a thin film transistor configured on the substrate and electrically connected to the scan line and the data line;
   a semiconductor layer configured on the substrate;
   a metal capacitor electrode configured on the semiconductor layer, a projection area of the metal capacitor electrode on the substrate being located within a projection area of the semiconductor layer on the substrate, and an edge of the projection area of the metal capacitor electrode being spaced from an edge of a projection area of the semiconductor layer;
   a passivation layer configured on the substrate and covering the scan line, the data line, the thin film transistor, the metal capacitor electrode, and the semiconductor layer;
   a pixel electrode configured on the passivation layer and electrically connected to the thin film transistor, a projection area of the pixel electrode on the substrate being located outside the projection area of the semiconductor layer on the substrate; and
   a transparent capacitor electrode configured on the passivation layer, a projection area of the transparent capacitor electrode on the substrate being located within the projection area of the metal capacitor electrode on the substrate.

2. The pixel structure as claimed in claim 1, wherein a minimum distance between an edge of the projection area of the transparent capacitor electrode on the substrate and the edge of the projection area of the metal capacitor electrode on the substrate is greater than or substantially equal to 0 micrometer and smaller than or substantially equal to 6 micrometers.

3. The pixel structure as claimed in claim 1, wherein a minimum distance between an edge of the projection area of the transparent capacitor electrode on the substrate and the edge of the projection area of the metal capacitor electrode on the substrate is greater than or substantially equal to 1 micrometer and smaller than or substantially equal to 4 micrometers.

4. The pixel structure as claimed in claim 1, wherein a minimum distance between an edge of the projection area of the pixel electrode on the substrate and the edge of the projection area of the semiconductor layer on the substrate is greater than or substantially equal to 1.6 micrometer and smaller than or substantially equal to 6 micrometers.

5. The pixel structure as claimed in claim 1, wherein a minimum distance between an edge of the projection area of the pixel electrode on the substrate and the edge of the projection area of the semiconductor layer on the substrate is greater than or substantially equal to 2 micrometers and smaller than or substantially equal to 4 micrometers.

6. The pixel structure as claimed in claim 1, further comprising a gate metal layer located on the substrate, a projection area of the gate metal layer on the substrate at least covering an area of the substrate other than the projection area of the pixel electrode on the substrate.

7. The pixel structure as claimed in claim 6, further comprising a gate insulation layer configured between the passivation layer and the substrate, the gate insulation layer covering the gate metal layer.

8. The pixel structure as claimed in claim 1, wherein the pixel electrode has a plurality of fine slits.

\* \* \* \* \*